(12) United States Patent
Horn et al.

(10) Patent No.: US 9,266,768 B2
(45) Date of Patent: Feb. 23, 2016

(54) HIGH PURITY NICKEL MOLDS FOR OPTICAL QUALITY GLASS FORMING

(71) Applicant: CORNING INCORPORATED, Corning, NY (US)

(72) Inventors: Kristen Marie Horn, Painted Post, NY (US); David Myron Lineman, Painted Post, NY (US); Kevin Thomas Morris, Hammondsport, NY (US); Wenchao Wang, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/158,242

(22) Filed: Jan. 17, 2014

(65) Prior Publication Data

US 2014/0206523 A1    Jul. 24, 2014

Related U.S. Application Data

(60) Provisional application No. 61/754,798, filed on Jan. 21, 2013.

(51) Int. Cl.
| | |
|---|---|
| *B32B 9/00* | (2006.01) |
| *C03B 40/00* | (2006.01) |
| *C03B 11/00* | (2006.01) |
| *C03B 23/035* | (2006.01) |
| *C23C 8/10* | (2006.01) |
| *C03B 40/02* | (2006.01) |
| *C03B 23/025* | (2006.01) |

(Continued)

(52) U.S. Cl.
CPC ............... *C03B 40/00* (2013.01); *C03B 11/00* (2013.01); *C03B 23/002* (2013.01); *C03B 23/023* (2013.01); *C03B 23/0252* (2013.01); *C03B 23/0302* (2013.01); *C03B 23/0355* (2013.01); *C03B 23/0357* (2013.01); *C03B 40/02* (2013.01); *C23C 8/10* (2013.01); *Y02P 40/57* (2015.11)

(58) Field of Classification Search
None
See application file for complete search history.

(56) References Cited

U.S. PATENT DOCUMENTS

| | | | | |
|---|---|---|---|---|
| 1,575,122 A | * | 3/1926 | Madsen | ............ 428/469 |
| 2,746,209 A | | 5/1956 | Walters | |

(Continued)

FOREIGN PATENT DOCUMENTS

| | | |
|---|---|---|
| CN | 1733963 | 2/2006 |
| CN | 101549946 | 12/2010 |

(Continued)

OTHER PUBLICATIONS

Patent Cooperation Treaty International Notification of Transmittal of the International Search Report and the Written Opinion of the International Searching Authority, international application No. PCT/US2014/012288; mailing date Apr. 17, 2014, 11 pages.
Manns, P., et. Al., "Glass in contact with mould materials for container production", Glass Science and Technology, vol. 68, No. 12, Dec. 1, 1995, pp. 389-399.

*Primary Examiner* — Humera Sheikh
*Assistant Examiner* — Seth Dumbris
(74) *Attorney, Agent, or Firm* — John T. Haran

(57) ABSTRACT

The present disclosure relates to high purity nickel molds for use in forming three dimensional glass substrates, along with methods of making three dimensional glass substrates. The mold compositions minimize imperfections in the formed glass substrates providing optical quality shaped glass articles for use in electronics applications.

21 Claims, 2 Drawing Sheets

(51) Int. Cl.
*C03B 23/03* (2006.01)
*C03B 23/00* (2006.01)
*C03B 23/023* (2006.01)

(56) References Cited

U.S. PATENT DOCUMENTS

| | | | | |
|---|---|---|---|---|
| 4,188,240 | A | * | 2/1980 | Yoshio ............................ 148/272 |
| 5,656,104 | A | | 8/1997 | Imamura et al. ............... 148/325 |
| 5,756,130 | A | * | 5/1998 | Umebayashi et al. ......... 425/385 |
| 5,876,478 | A | | 3/1999 | Imamura et al. ............ 65/374.11 |
| 5,964,916 | A | * | 10/1999 | Segawa et al. .............. 65/374.11 |
| 6,207,247 | B1 | * | 3/2001 | Morita .......................... 428/64.1 |
| 2002/0054976 | A1 | * | 5/2002 | Nakamura et al. ............ 428/66.6 |
| 2005/0095404 | A1 | | 5/2005 | Schillert et al. |
| 2009/0236016 | A1 | | 9/2009 | Masuda et al. ................ 148/517 |
| 2012/0047953 | A1 | * | 3/2012 | Feng et al. ....................... 65/102 |

FOREIGN PATENT DOCUMENTS

| | | | | |
|---|---|---|---|---|
| CN | 102248358 | | 11/2011 | |
| CN | 102501047 | | 6/2012 | |
| CN | 102560265 | | 7/2012 | |
| CN | 102626847 | | 8/2012 | |
| CN | 102730943 | | 10/2012 | |
| DE | 132 711 | | 6/1902 | |
| EP | 1285974 | | 2/2003 | |
| EP | 2 540 682 | | 1/2013 | |
| JP | 2010-111055 | * | 5/2010 | ............. B29C 59/02 |
| KR | 1053701 | | 8/2011 | |
| KR | 1073717 | | 10/2011 | |
| WO | 88/09990 | | 12/1988 | |

* cited by examiner

HIGH PURITY NICKEL MOLDS FOR OPTICAL QUALITY GLASS FORMING

CROSS REFERENCES TO RELATED APPLICATIONS

This application claims the benefit of priority under 35 U.S.C. §119 of U.S. to Provisional Application Ser. No. 61/754,798, filed on Jan. 21, 2013, and is related to "Molds for Shaping Glass and Methods for Making the Same," U.S. application Ser. No. TBD, contemporaneously filed on Jan. 17, 2014 and also claiming priority under 35 U.S.C. §119 of U.S. to Provisional Application Ser. No. 61/754,798, filed on Jan. 21, 2013, the content of both of which is relied upon and incorporated herein by reference in its entirety.

BACKGROUND

1. Field

The present specification relates to molds for forming three-dimensional glass substrates, and methods for forming three dimensional glass substrates.

2. Technical Background

The current demand in modern electronics devices for thin, three dimensional glass substrates that have very high levels of surface quality has produced a need to find new materials and processes that are commercially capable of providing defect-free shaped glass substrates. Shaped glass forming generally refers to high temperature processes that involve heating the glass to be formed to a temperature at which it can be manipulated, and then conforming it to a mold to get the designed shape. Classic methods of shaping glass substrates include television tube forming, where a softened glass gob is pressed between male & female molds, and bottle forming, where glass is blown in a pair of hollowed molds.

In shaping operations, mold material selection is often the key to success. In order to optimize the shape and surface quality of the formed glass article, the mold material must: 1) have excellent oxidation and corrosion resistances at the process temperatures; 2) have minimal reaction with the glass (no sticking); and 3) be strong enough at the process temperature in order to resist the deformation and distortion from the forming force.

In reality, it can be difficult to select one material to meet all the above requirements. One solution has been to apply coatings on the mold surface to get the combined merits of the various materials to achieve forming success. Coated molds are the most commonly used in the glass forming industries today. Uncoated molds (or bare molds) are rare, and are limited to lower-end glass products such as bottles and certain glassware that don't require high surface quality. If bare molds are used, there is generally some level of lubrication applied to help with the forming process and to retain surface quality. These lubricants are difficult to consistently apply and require a secondary cleaning step to remove. For higher-end products, especially for optical-quality products such as press-formed camera lenses, coatings have been deemed as essential.

Although coatings help to meet the challenges in glass forming process, they create new problems. For example, coatings can add significant costs and new variables to manage the processes. More importantly, coatings often deteriorate during operation and lose functionality, limiting the lifetime of the mold and necessitating frequent re-coating. Therefore, there is an unmet need in the area of high-end, high quality glass substrates to obtain better mold materials that are commercially capable of providing defect-free, shaped glass substrates.

SUMMARY

A first aspect comprises a substrate for shaping glass comprising a mold having a shaping surface, wherein the mold comprises greater than 93% nickel, and a nickel oxide layer on the shaping surface, wherein the nickel oxide layer has a thickness from about 200 nm to about 20 µm. In the alternative, the nickel oxide layer may have an average thickness from about 500 nm to about 20 µm, or from about 2 µm to about 8 µm. In some embodiments, the mold comprises at least about 97% nickel or alternatively, comprises from about 93% to about 99.99% nickel. In some aspects, the mold's shaping surface may have a root mean square surface roughness ($R_{RMS}$) from about 1 nm to about 3 µm, or alternatively, less than 3 µm, 1 µm, or 500 nm over a 1 cm evaluation length. In other embodied aspects, the mold's shaping surface has a waviness height ($W_a$) of less than 100 nm, 40 nm, or 20 nm over a 1 cm evaluation length.

Additionally, substrates embodied herein may further comprise less than 1 mol % of one or more of Cu, Fe, Mn, C, Si, S, Mg, Al or Ti, less than 1 mol % of Cu, Fe, Mn, C, Si, S, Mg, Al and Ti, less than 0.5 mol % of one or more of Cu, Fe, Mn, C, Si, S, Mg, Al or Ti, or less than 0.5 mol % of Cu, Fe, Mn, C, Si, S, Mg, Al and Ti.

Another aspect comprises a method of shaping a glass sheet comprising placing a glass sheet on a substrate comprising a mold having a shaping surface, wherein the mold comprises greater than 93% nickel, and a nickel oxide layer on the shaping surface, wherein the nickel oxide layer has a thickness from about 200 nm to about 20 µm; heating the glass sheet and/or substrate to a temperature sufficient to allow for shaping the glass sheet; and applying negative pressure, positive pressure, a negative force, or a positive force to the glass sheet to produce a shaped glass sheet. In some embodiments, the temperature sufficient to allow for shaping the glass sheet corresponds to the temperature at which the glass sheet has a viscosity of $10^7$ Poise to $10^{11}$ Poise or between an annealing point and softening point of the glass. In some embodiments, the temperature of the glass sheet is about 20° C. or greater than the temperature of the substrate when applying negative pressure, positive pressure, a negative force, or a positive force to the glass sheet to produce the shaped glass sheet. In some embodiments, the temperature of the glass sheet is from about 50° C. to about 250° C. greater than the temperature of the substrate when applying negative pressure, positive pressure, a negative force, or a positive force to the glass sheet to produce the shaped glass sheet.

In some embodied methods, the glass sheet comprises a borosilicate, a soda lime, or an aluminosilicate glass. In some of these embodiments, the glass is an aluminosilicate glass and comprises about 50 to about 75 mol % $SiO_2$, about 5 to about 30 mol % $Al_2O_3$, and about 10 mol % to about 25 mol % $Na_2O$. In other embodiments, the aluminosilicate glass further comprises from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 10 mol % MgO; and from 0 mol % to about 5 mol % CaO. In some embodiments, the aluminosilicate glass comprises from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol %≤$Li_2O+Na_2O+K_2O$≤20 mol % and 0 mol %≤MgO+CaO≤10 mol %.

Substrates used in the embodied methods described above may alternatively comprise a nickel oxide layer having an average thickness from about 500 nm to about 20 μm, or from about 2 μm to about 8 μm. In some embodied methods, the mold comprises at least about 97% nickel or alternatively, comprises from about 93% to about 99.99% nickel. In other methods, the mold's shaping surface may have a root mean square surface roughness ($R_{RMS}$) from about 1 nm to about 3 μm, or alternatively, less than 3 μm, 1 μm, or 500 nm over a 1 cm evaluation length. In other embodied methods, the mold's shaping surface has a waviness height ($W_a$) of less than 100 nm, 40 nm, or 20 nm over a 1 cm evaluation length. Additionally, the substrates used in the methods described may further comprise less than 1 mol % of one or more of Cu, Fe, Mn, C, Si, S, Mg, Al or Ti, less than 1 mol % of Cu, Fe, Mn, C, Si, S, Mg, Al and Ti, less than 0.5 mol % of one or more of Cu, Fe, Mn, C, Si, S, Mg, Al or Ti, or less than 0.5 mol % of Cu, Fe, Mn, C, Si, S, Mg, Al and Ti.

Another aspect comprises a shaped glass article made by any one of the processes above.

It is to be understood that both the foregoing general description and the following detailed description are exemplary of the invention and are intended to provide an overview or framework for understanding the nature and character of the invention as it is claimed. The accompanying drawings are included to provide a further understanding of the invention and are incorporated in and constitute a part of this specification. The drawings illustrate various embodiments of the invention and together with the description serve to explain the principles and operation of the invention.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

FIG. 2 shows micrographs comparing nickel molds of various compositions.

DETAILED DESCRIPTION

Figure 1:
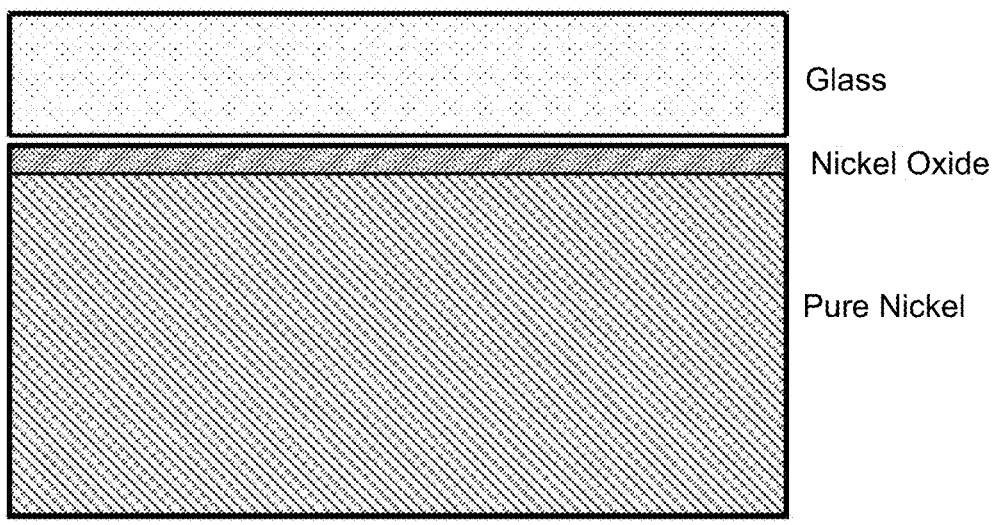
FIG. 1 is a diagram of one embodiment wherein the nickel mold comprises a layer of nickel oxide on surface. The nickel oxide may be formed via a high temperature forming operation. The nickel-nickel oxide molds have excellent non-sticking character, which give superior surface quality to the formed glass.

The present embodiments can be understood more readily by reference to the following detailed description, drawings, examples, and claims, and their previous and following description. However, before the present compositions, articles, devices, and methods are disclosed and described, it is to be understood that this description is not limited to the specific compositions, articles, devices, and methods disclosed unless otherwise specified, as such can, of course, vary. It is also to be understood that the terminology used herein is for the purpose of describing particular aspects only and is not intended to be limiting.

The following description is provided as an enabling teaching. To this end, those skilled in the relevant art will recognize and appreciate that many changes can be made to the various embodiments described herein, while still obtaining the beneficial results. It will also be apparent that some of the desired benefits can be obtained by selecting some of the features without utilizing other features. Accordingly, those who work in the art will recognize that many modifications and adaptations to the present embodiments are possible and can even be desirable in certain circumstances and are a part of the present description. Thus, the following description is provided as illustrative and should not be construed as limiting.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the meanings detailed herein.

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise As used herein, the term "substrate" describes a glass sheet that may be formed into a three-dimensional structure.

Embodiments herein comprise nickel metal-based molds that are useful in the formation of three-dimensional glass substrates. The glass substrates may be useful as front and/or back covers for electronics devices, such as telephones, electronic tablets, televisions etc. In these electronics applications, the shape and the surface quality of the glass substrate needs to be within very tight tolerances in order to provide not only aesthetic appeal, but also to minimize weaknesses in glass surface, potential electronics issues, and minimize costs.

A first aspect comprises nickel molds with high purities, such as commercially-pure nickel, for formation of three-dimensional glass substrates. High purity and ultra-high purity nickel metals, as described below, have excellent high temperature oxidation and corrosion resistances, as well as excellent non-sticking characteristics when contacted by the softened glass. High purity and ultra-high purity nickels are relatively soft, and therefore have been thought to not be strong enough for conventional glass forming operations. However, because the embodied processes do not apply heavy force on the mold, they allow for use of these materials in novel ways.

In one embodiment, the nickel mold comprises high purity nickel. The high purity nickel molds make it possible to form optical-quality glass articles. As used herein, high purity nickel molds comprise molds with a composition comprising at least 93%, 95%, 97%, 98%, 99%, 99.5%, 99.9%, 99.95%, or 99.99% nickel. In some embodiments, high purity nickel molds comprise molds with a composition comprising from about 93% to about 99.99% nickel, about 95% to about 99.99% nickel, about 97% to about 99.99% nickel, about 98% to about 99.99% nickel, about 99% to about 99.99% nickel, about 99.5% to about 99.99% nickel, about 99.9% to about 99.99% nickel, about 95% to about 99.95% nickel, about 97% to about 99.95% nickel, about 98% to about 99.95% nickel, about 99% to about 99.95% nickel, about 99.5% to about 99.95% nickel, about 99.9% to about 99.95% nickel, about 95% to about 99.9% nickel, about 97% to about 99.9% nickel, about 98% to about 99.9% nickel, about 99% to about 99.9% nickel, about 99.5% to about 99.9% nickel, about 95% to about 99.5% nickel, about 97% to about 99.5% nickel, about 98% to about 99.5% nickel, about 99% to about 99.5% nickel, about 95% to about 99% nickel, about 97% to about 99% nickel, about 98% to about 99% nickel, about 95% to about 98% nickel, about 97% to about 98% nickel, or about 95% to about 97% nickel.

In some embodiments, the molds comprise ultra high purity nickel. As used herein, ultra high purity nickel molds comprise molds with a composition comprising at least 99%, 99.5%, 99.9%, 99.95%, or 99.99% nickel. In some embodiments, ultra high purity nickel molds comprise molds with a composition comprising from about 99% to about 99.99% nickel, about 99.5% to about 99.99% nickel, about 99.9% to about 99.99% nickel, about 99% to about 99.95% nickel, about 99.5% to about 99.95% nickel, about 99.9% to about 99.95% nickel, about 99.9% to about 99.95% nickel, about 99% to about 99.9% nickel, about 99.5% to about 99.9% nickel, or about 99% to about 99.5% nickel.

Examples of nickel compositions that may be used herein include, but are not limited to, commercially pure nickel grades 200 (99.6% Ni, 0.04% C), 201 (99.6% Ni, 0.02% C maximum), 205 (99.6% Ni, 0.04% C, 0.04% Mg), 212 (97.0% Ni), 222 (99.0% Ni), 233 (99% Ni), and 270 (99.97% Ni) (See. e.g., Special-Purpose Nickel Alloys, in ASM SPECIALTY HANDBOOK: NICKEL, COBALT AND THEIR ALLOYS, #06178G (ASM International 2000), herein incorporated by reference in its entirety).

In another aspect, the nickel molds further comprise a nickel oxide coating. The nickel oxide coating formed on the nickel mold has a thickness of from about 200 nm to about 20 μm, about 500 nm to 15 μm, about 1 μm to 12 μm, about 2 μm to 10 μm, or about 3 μm to 5 μm. In some embodiments, the nickel oxide coating formed on the nickel mold has a thickness of 100 nm, 200 nm, 300 nm, 400 nm, 500 nm, 750 nm, 1 μm, 2 μm, 3 μm, 4 μm, 5 μm, 6 μm, 7 μm, 8 μm, 9 μm, 10 μm, 12 μm, 15 μm, 18 μm, or 20 μm.

The nickel molds have a three-dimensional shaped structure. The surface structure of the molds may show variations or imperfections. The possible components of a surface structure are described in *Surface Texture (Surface Roughness, Waviness, and Lay)*, ASME B46-1-2003 (ASME, 2003). In particular a real surface may comprise errors of form, flaws, lay, roughness, surface texture, and/or waviness. Surface texture is the composite of certain deviations that are typical of the surface, such as roughness and waviness. Roughness is generally described as "finer irregularities of the surface texture that usually result from the inherent actions of the production process or material condition, such as polishing or grinding. Embodiments herein may have a surface finished via polishing via the use of 600, 700, 800, 1000, 1200, 1500, 1800, or 2000 grit abrasive. In some embodiments, the abrasive is SiC or $Al_2O_3$. The root mean square average of the profile height deviations measured from a mean line taken with an evaluation length, L, can be described by:

$$R_{RMS}=(1/L)\int Z(x)^2 dx)^{1/2}.$$

In the case of large waviness backgrounds, the profile may be filtered to attenuate the waviness aspect of the profile to obtain a roughness profile that can be used to determine the root mean square roughness. In some embodiments, the root mean square roughness ($R_{RMS}$) of the mold surface is from about 1 nm to about 3 μm over an evaluation length of 1, 2, 5, or cm as measured via a 3D optical surface profiler (e.g., ZYGO® ZEMAPPER™ optical surface profiler). In some embodiments, the $R_{RMS}$ is less than about 0.5 nm, 1 nm, 2 nm, 5 nm, 10 nm, 20 nm, 50 nm, 100 nm, 200 nm, 500 nm, 0.75 μm, 1 μm, 2 μm, or 3 μm over an evaluation length of 1 cm.

Alternatively, waviness describes the widely spaced component of the surface texture that may be periodic in structure, i.e., sinusoidal in appearance. The waviness height, $W_a$, describes the peak-to-valley height of the modified surface profile from which the roughness and part form have been removed by filtering, smoothing, etc. In some embodiments, the $W_a$ is from about 1 nm to about 100 nm over an evaluation length of 1 cm. In some embodiments, the $W_a$ is less than about 1 nm, 2 nm, 5 nm, 10 nm, 20 nm, 40 nm, 60 nm, 80 nm, or 100 nm over an evaluation length of 1 cm.

The compositions described herein make it possible to form optical-quality glass articles with uncoated molds. In some embodiments, the high purity and ultra-high purity nickel molds are uncoated and are used in an uncoated form in the processes described herein.

In another aspect, the substrates formed using the high purity and ultra-high purity nickel molds have a reduced number of defects. Ideally, the as formed quality of the part would be as good as the glass sheet from which it is formed. For the most economical process, one desires that this surface quality is achieved without further rework or polishing of the as formed surface. Defects, as used herein, include, but are not limited to, dimples (depressions in the glass surface), surface checks/cracks, blisters, chips, cords, dice, observable crystals, laps, seeds, stones, and stria. In some embodiments, there are less than an average of 50, 40, 30, 20, 10, 5, 4, 3, 2, or 1 defects that are observable by the unaided human eye at 1000 lux in a 25 mm×25 mm area on any of the surfaces. In some embodiments, there are less than an average of 50, 40, 30, 20, 10, 5, 4, 3, 2, or 1 defects that are 150 μm in the largest dimension in a 25 mm×25 mm area on any of the surfaces, as measured at 1000 lux by optical microscopy. In some embodiments, the defect is 1, 2, 3, 5, 10, 20, 30, 40, 50, 60, 70, 80, 90, 100, 125, or 150 µm in the largest dimension.

In another aspect, the substrates formed using the high purity and ultra-high purity nickel molds are essentially flawless. By "essentially flawless," it is meant that there are no indentations (or dimples) larger than 150 µm in diameter, as measured by an optical microscopy technique, in the surfaces. In some embodiments, there are less than an average of 50, 40, 30, 20, 10, 5, 4, 3, 2, or 1 indentations (or dimples) larger than 150 µm in diameter in the largest dimension in an 25 mm×25 mm area on any of the surfaces, as measured by optical microscopy. In some embodiments, the dimple size is larger than 1, 2, 3, 5, 10, 20, 30, 40, 50, 60, 70, 80, 90, 100, 125, or 150 µm in the largest dimension.

Without intending to be held to a particular theory, it is believed the decrease in the level of defects on the as formed glass surface with high purity and ultra-high purity nickel molds is due to at least two causes. First, nickel and nickel oxide appear to be unreactive with the glass. In particular, aluminosilicate glasses appear to be highly unreactive. By unreactive it is intended to mean that the glass doesn't readily stick to the Ni mold material and there is no significant chemical reaction between the glass or glass volatiles that causes the build-up of material on the mold surface.

The second reason for the decreased level of defects on the as formed glass surface with high purity and ultra-high purity nickel is the reduced level of impurities and inclusions in the nickel. These impurities may comprise one or more of the following: Cu, Fe, Mn, C, Si, S, Mg, Al and Ti. These impurities are typically present in the Ni based alloys as oxides, sulfides and carbides. In many if not most cases the oxides, sulfides and carbides exist in the microstructure of the Ni alloy as a distinct phase, commonly called an inclusion, that is randomly distributed throughout the alloy. A certain percentage of these inclusions will end up on the machined and polished surface of the mold. During the glass forming process, these inclusions that are at or near the mold surface can be reactive with the glass and stick to it, or oxidize and react at a rate that is different from the bulk metal and thus form a protrusion on the mold surface. In some embodiments, the nickel mold is substantially free of Cu, Fe, Mn, C, Si, S, Mg, Al and Ti, wherein "substantially free" means that the element is present at less than 1 mol %. In some embodiments, the nickel mold is highly substantially free of Cu, Fe, Mn, C, Si, S, Mg, Al and Ti, wherein "highly substantially free" means that the element is present at less than 0.5 mol %.

Both conditions cause a localized area on the mold surface that can stick to the glass or cause high pressure points that drag across the glass surface during the forming process and cause defects in the as formed surface. It follows that as the high purity and ultra-high purity nickel mold becomes purer, the number of inclusions in the metal decreases and the frequency of inclusions that intersect the machined mold surface decreases. Decreased inclusions on the forming surface lead to decreased occurrence of defects on the as formed glass surface.

The high purity and ultra-high purity nickel mold embodied herein may be formed via casting or machining processes. Subsequent finishing steps, such as machining, polishing, etc. may be used to provide a smooth surface. In some embodiments, the high purity or ultra-high purity nickel mold is exposed to temperatures greater than 300° C., 400° C., 500° C., 600° C., 700° C., 800° C., 900° C., or 1000° C. In some embodiments, high purity and ultra-high purity nickel mold is exposed to temperatures from about 300° C. to about 1000° C., about 400° C. to about 1000° C., about 500° C. to about 1000° C., about 600° C. to about 1000° C., about 700° C. to about 1000° C., about 800° C. to about 1000° C., about 900° C. to about 1000° C., about 300° C. to about 900° C., about 400° C. to about 900° C., about 500° C. to about 900° C., about 600° C. to about 900° C., about 700° C. to about 900° C., about 800° C. to about 900° C., about 300° C. to about 800° C., from about 400° C. to about 800° C., from about 500° C. to about 800° C., from about 600° C. to about 800° C., from about 700° C. to about 800° C., from about 300° C. to about 700° C., from about 400° C. to about 700° C., from about 500° C. to about 700° C., from about 600° C. to about 700° C., from about 300° C. to about 600° C., from about 400° C. to about 600° C., from about 500° C. to about 600° C., from about 300° C. to about 500° C., from about 400° C. to about 500° C., or from about 300° C. to about 400° C. In some embodiments, the high purity or ultra-high purity nickel mold is exposed the above-listed temperatures for a time period of from about 1 minute to about 24 hours. In some embodiments, the high purity or ultra-high purity nickel mold is exposed the above-listed temperatures for a time period of greater than 1 min, 5 min, 10 min, 30 min, 1 hr, 2 hr, 3 hr, 4 hr, 5 hr, 6 hr, 7 hr, 8 hr, 9 hr, 10 hr, 15 hr, 18 hr, or 24 hr.

Embodiments of the molds described herein may be used in any appropriate 3D glass forming processes. The molds are especially useful in forming 3D glass substrates when used in combination with the methods and devices described in U.S. application Ser. Nos. 13/480,172 and 13/709,594. Processes embodied in U.S. application Ser. Nos. 13/480,172 and 13/709,594 use a mold temperature fairly close to that of the glass—meaning the mold operates at a temperature in the range of 600 to 700° C. The issue of glass sticking to the mold during the forming process is a well-known to increase with increased mold/metal temperature. These mold temperatures are at least 100-200° C. hotter than the typical temperature of a mold used in a pressing process. The operational range in which the described vacuum forming is done comprises a region where mold to glass sticking occurs and which leads to cosmetic and structural defect formation in the glass. The embodied high and ultra-high purity nickel molds provide a novel means of addressing this sticking or adhesion issue and provide glass substrates with little to no surface defects or flaws.

In some embodiments, the nickel molds may be used in the following process: a typical thermal reforming process involves heating the 2D glass sheet to a forming temperature, e.g., a temperature in a temperature range corresponding to a glass viscosity of $10^7$ Poise to $10^{11}$ Poise or between an annealing point and softening point of the glass, while the 2D glass sheet is on top of a mold. The heated 2D glass sheet may start sagging once heated. Typically, vacuum is then applied in between the glass sheet and mold to conform the glass sheet to the mold surface and thereby form the glass into a 3D glass article. Alternatively, positive pressure, a combination of vacuum and positive pressure, or a press device may be used to shape the glass sheet. After forming the 3D glass article, the 3D glass article is cooled to a temperature below the strain point of the glass, which would allow handling of the 3D glass article.

It may be advantageous in some embodied processes to heat the glass and mold in such a way that the two are at different temperatures during the shaping step, meaning when the glass starts to sag, is subjected to vacuum, positive pressure, physical pressing or a combination thereof, or alternatively, when the glass sheet has a viscosity of from $10^7$ Poise to $10^{11}$ Poise or between an annealing point and softening point of the glass. In such embodiments, the temperature difference between the mold and the glass may be from about 20° C. to about 300° C. different, about 50° C. to about 250° C. different, or about 50° C. to about 200° C. different. Alternatively, the temperature difference between the mold and the glass may be 10° C. or greater, 20° C. or greater, 40° C. or greater, 60° C. or greater, 80° C. or greater, or 100° C. or greater. In some embodiments the glass is preferentially heated such that the glass is hotter than the mold.

The glass substrates formed via the embodiments herein may be described by U.S. Prov. Appl. No. 61/653,476. The three-dimensional (3D) substrates can be used to cover an electronic device having a display, for example as part or all of the front, back, and or sides of the device. The 3D cover glass can protect the display while allowing viewing of and interaction with the display. If used as the front cover, the substrate can have a front cover glass section for covering the front side of the electronic device, where the display is located, and one or more side cover glass sections for wrapping around the peripheral side of the electronic device. The front cover glass section can be made contiguous with the side cover glass section(s).

The glass substrate used to in the processes described herein typically starts as a two dimensional (2D) glass sheet. The 2D glass sheet may be made by a fusion or float process. In some embodiments, the 2D glass sheet is extracted from a pristine sheet of glass formed by a fusion process. The pristine nature of the glass may be preserved up until the glass is subjected to a strengthening process, such as an ion-exchange chemical strengthening process. Processes for forming 2D glass sheets are known in the art and high quality 2D glass sheets are described in, for example, U.S. Pat. Nos. 5,342,426, 6,502,423, 6,758,064, 7,409,839, 7,685,840, 7,770,414, and 8,210,001.

Glass compositions that may be used as glass sheets with the molds described herein include all compositions that show little to no reactivity with the mold surface. These include soda lime glasses, low-melting lithium aluminosilicate-type glasses, borosilicate glasses, and aluminosilicate glasses.

In one embodiment, the substrate is made from an alkali aluminosilicate glass composition. In some embodiments, the aluminosilicate comprises about 50 to about 75 mol % $SiO_2$, about 5 to about 30 mol % $Al_2O_3$, and about 10 mol % to about 25 mol % $Na_2O$. An exemplary alkali-aluminosilicate glass composition comprises at least about 50 mol % $SiO_2$ and at least about 11 mol % $Na_2O$, and the compressive stress is at least about 900 MPa. In some embodiments, the glass further comprises $Al_2O_3$ and at least one of $B_2O_3$, $K_2O$, MgO and ZnO, wherein $-340+27.1.Al_2O_3-28.7.B_2O_3+15.6.Na_2O-61.4.K_2O+8.1.(MgO+ZnO) \geq 0$ mol %. In particular embodiments, the glass comprises: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO. The exemplary glass is described in U.S. Provisional Patent Application No. 61/503,734 by Matthew J. Dejneka et al., entitled "Ion Exchangeable Glass with High Compressive Stress," filed Jul. 1, 2011.

Another exemplary alkali aluminosilicate glass composition comprises from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol % $\leq Li_2O+Na_2O+K_2O \leq 20$ mol % and 0 mol % $\leq MgO+CaO \leq 10$ mol %. This alkali aluminosilicate glass is described in U.S. Pat. No. 8,158,543.

Other types of glass compositions besides those mentioned above and besides alkali-aluminosilicate glass composition may be used for the 3D cover glass. For example, alkali-aluminoborosilicate glass compositions or lithium aluminosilicate glass compositions may be used for the 3D cover glass. Preferably, the glass compositions used are ion-exchangeable glass compositions, which are generally glass compositions containing small alkali or alkaline-earth metals ions that can be exchanged for large alkali or alkaline-earth metal ions. Additional examples of ion-exchangeable glass compositions may be found in U.S. Pat. Nos. 7,666,511, 4,483,700, and U.S. Pat. No. 5,674,790 and U.S. patent application Ser. No. 12/277,573 (Dejneka et al.; 25 Nov. 2008), Ser. No. 12/392,577 (Gomez et al.; 25 Feb. 2009), Ser. No. 12/856,840 (Dejneka et al.; 10 Aug. 2010), Ser. No. 12/858,490 (Barefoot et al.; 18 Aug. 18, 2010), and Ser. No. 13/305,271 (Bookbinder et al.; 28 Nov. 2010).

Additionally, because the glass does not stick to the mold, it is possible to use very thin glass sheets and still obtain shaped glass articles that have little to no distortion and/or imperfections that results from glass-mold interactions. In some embodiments, the glass sheet has a thickness from about 0.1 µm to about 2.0 mm, or about 0.3 µm to about 1.8 mm. In other embodiments, the glass sheet has a thickness from about 0.5 µm to about 1.5 mm.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. All patents, published and unpublished applications, and articles referenced herein are incorporated by reference in their entireties.

EXAMPLES

Example 1

Molds can be machined from a high-purity or ultra-high purity nickel, such as Nickel 200 (99.0% pure), Nickel 201 (99.0% pure), a dual-certified grade of Nickel 200/201, or Nickel 270 (99.9% pure). The surface can then be polished to the desired finish. The molds can be used in bare state without any coating. During forming operation, which can be done at from about 500° C. to about 650° C., the nickel molds will be oxidized, forming a layer of nickel oxide on surface (FIG. 1). This layer provides the desired non-sticking functionality.

Example 2

Figure 2A:
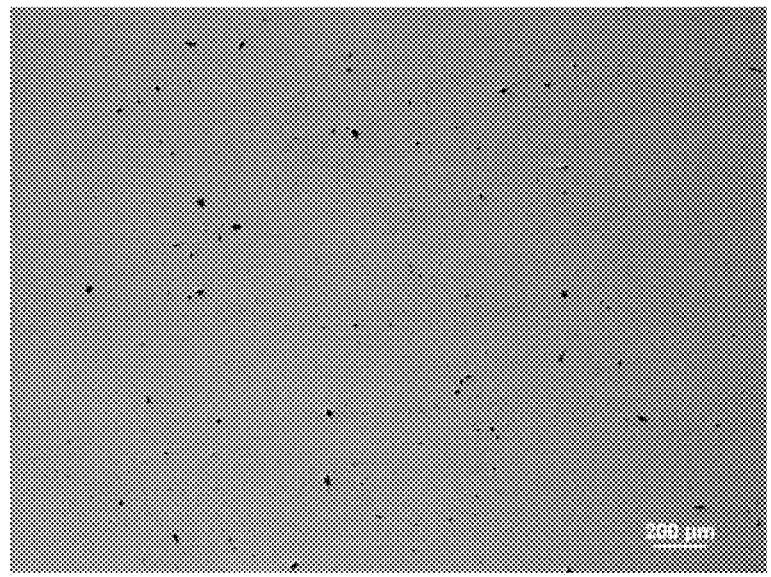
FIG. 2A is a micrograph of Ni201 (Ni200 is similar) which shows inclusions in the surface.
Figure 2B:
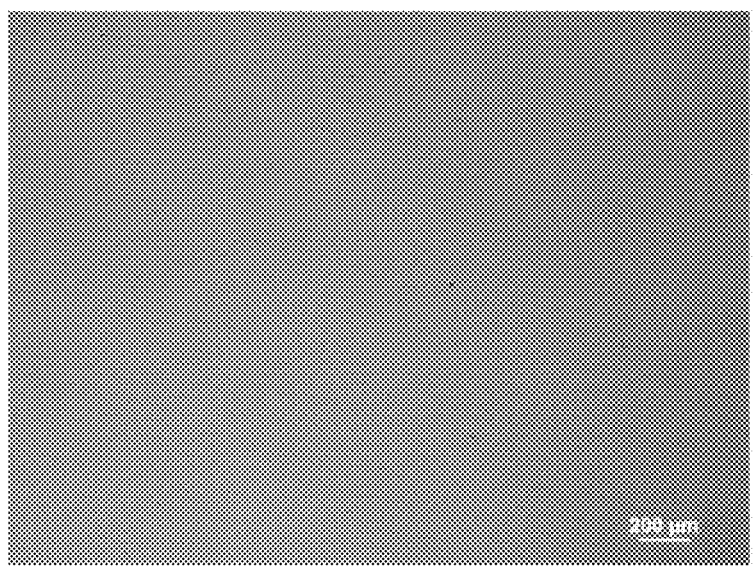
FIG. 2B is a micrograph of Ni270 (purer Ni), with has less inclusions and the inclusions observed are of much smaller size.

High purity and ultra-high purity nickel grades can form a non-sticking nickel oxide layer, and therefore can have good performance without coating. Among the three grades listed above, Ni270 appears best due to its highest purity (FIG. 2B), with Ni201 showing higher levels of defects (FIG. 2A). Ni270 is also the most expensive material, and is generally less readily available than Ni200 and Ni201. Ni201 is a lower-carbon version of Ni200, so can perform slightly better than Ni200. The most readily available grade in the market is dual-certified Ni200/201 which can be equivalent to Ni201 in performance.

Example 3 (Comparative)

Molds made of other metals, such as carbon steels, stainless steels, copper alloys, and nickel alloys, can form oxide layers at high temperature, but these oxide layers will not have non-sticking functionality. For example, iron oxide (from carbon steels), chromium oxide (from stainless steels), and copper oxide (from copper alloys) will all stick to the glass. Nickel alloys with lower purities also can show a tendency to adhere to glass, possibly at least in part because their nickel oxide layer is usually mixed with other impurity oxides that can fuse with the glass, such as magnesium oxide, aluminum oxide, calcium oxide, and silicon oxide.

Example 4

A comparison of TiAlN or TiN coated Inconel 718 molds is done with uncoated Ni201 molds. The performance of Ni201 molds is superior to Inconel 718 molds. Inconel 718 molds have an average life of 100 to 150 cycles. After that, the coating deteriorates and the molds have to be refurbished. In contrast, Ni201 molds have shown an average life of greater than 1,000 cycles, and maintain excellent performance.

The invention claimed is:

1. A substrate for shaping glass comprising:
    a. a mold having a shaping surface, wherein the mold comprises greater than 93% nickel; and
    b. a nickel oxide layer on the shaping surface, wherein the nickel oxide layer has a thickness from about 500 nm to about 20 µm,
    wherein a waviness height ($W_a$) of the mold surface is less than 100 nm over a 1 cm evaluation length and a root mean squared roughness ($R_{RMS}$) of the mold surface is less than 3 µm over a 1 cm evaluation length.

2. The substrate of claim 1, wherein the mold comprises at least about 97% nickel.

3. The substrate of claim 2, wherein the mold comprises less than 1 mol % of one or more of Cu, Fe, Mn, C, Si, S, Mg, Al or Ti.

4. The substrate of claim 3, wherein the mold comprises less than 1 mol % of Cu, Fe, Mn, C, Si, S, Mg, Al and Ti.

5. The substrate of claim 3, wherein the mold the mold comprises less than 0.5 mol % of one or more of Cu, Fe, Mn, C, Si, S, Mg, Al or Ti.

6. The substrate of claim 5, wherein the mold the mold comprises less than 0.5 mol % of Cu, Fe, Mn, C, Si, S, Mg, Al and Ti.

7. The substrate of claim 1, wherein the nickel oxide layer has an average thickness from about 2 µm to about 8 µm.

8. The substrate of claim 1, wherein the waviness height ($W_a$) of the mold surface is less than 40 nm over a 1 cm evaluation length.

9. The substrate of claim 8, wherein the waviness height ($W_a$) of the mold surface is less than 20 nm over a 1 cm evaluation length.

10. The substrate of claim 1, wherein the root mean squared roughness ($R_{RMS}$) of the mold surface is less than 1 µm over a 1 cm evaluation length.

11. The substrate of claim 10, wherein the root mean squared roughness ($R_{RMS}$) of the mold surface is less than 500 nm over a 1 cm evaluation length.

12. A method of shaping a glass sheet comprising:
    a. placing a glass sheet on top of the substrate of claim 1;
    b. heating the glass sheet and/or substrate to a temperature sufficient to allow for shaping the glass sheet; and
    c. applying negative pressure, positive pressure, a negative force, or a positive force to the glass sheet to produce a shaped glass sheet.

13. The method of claim 12, wherein the temperature sufficient to allow for shaping the glass sheet corresponds to the temperature at which the glass sheet has a viscosity of $10^7$ Poise to $10^{11}$ Poise or between an annealing point and softening point of the glass.

14. The method of claim 12, wherein the temperature of the glass sheet is about 20° C. or greater than the temperature of the substrate when applying negative pressure, positive pressure, a negative force, or a positive force to the glass sheet to produce the shaped glass sheet.

15. The method of claim 14, wherein the temperature of the glass sheet is from about 50° C. to about 250° C. greater than the temperature of the substrate when applying negative pressure, positive pressure, a negative force, or a positive force to the glass sheet to produce the shaped glass sheet.

16. The method of claim 12, wherein the temperature is from about 300° C. to about 900° C.

17. The method of claim 16, wherein the glass sheet comprises a borosilicate, a soda lime, or an aluminosilicate glass.

18. The method of claim 17, wherein the glass is an aluminosilicate glass and comprises about 50 to about 75 mol% $SiO_2$, about 5 to about 30 mol% $Al_2O_3$, and about 10 mol% to about 25 mol% $Na_2O$.

19. The method of claim 18, wherein the aluminosilicate glass further comprises from about 7 mol% to about 26 mol% $Al_2O_3$; from 0 mol% to about 9 mol% $B_2O_3$; from about 11 mol% to about 25 mol% $Na_2O$; from 0 mol% to about 2.5 mol% $K_2O$; from 0 mol% to about 10 mol% MgO; and from 0 mol% to about 5 mol% CaO.

20. The method of claim 17, wherein the glass is an aluminosilicate glass comprising from about 60 mol% to about 70 mol% SiO2; from about 6 mol% to about 14 mol% $Al_2O_3$; from 0 mol% to about 15 mol% $B_2O_3$; from 0 mol% to about 15 mol% $Li_2O$; from 0 mol% to about 20 mol% Na2O; from 0 mol% to about 10 mol% K2O; from 0 mol% to about 8 mol% MgO; from 0 mol% to about 10 mol% CaO; from 0 mol% to about 5 mol% $ZrO_2$; from 0 mol% to about 1 mol% $SnO_2$; from 0 mol% to about 1 mol% $CeO_2$; less than 50 ppm $As_2O_3$; and less than about 50 ppm $Sb_2O_3$; wherein 12 mol% ≤$Li_2O$ +$Na_2O$ +$K_2O$ ≤20 mol% and 0 mol% ≤MgO +CaO ≤10 mol%.

21. The method of claim 12, wherein the glass sheet has a thickness of from about 0.1 µm to about 2.0 mm.

* * * * *